United States Patent
Yarus et al.

(10) Patent No.: US 10,324,228 B2
(45) Date of Patent: Jun. 18, 2019

(54) GRIDLESS SIMULATION OF A FLUVIO-DELTAIC ENVIRONMENT

(71) Applicant: Landmark Graphics Corporation, Houston, TX (US)

(72) Inventors: Jeffrey Marc Yarus, Houston, TX (US); Rae Mohan Srivastava, Toronto (CA); Marko Maucec, Englewood, CO (US)

(73) Assignee: LANDMARK GRAPHICS CORPORATION, Houston, TX (US)

( * ) Notice: Subject to any disclaimer, the term of this patent is extended or adjusted under 35 U.S.C. 154(b) by 415 days.

(21) Appl. No.: 14/889,121

(22) PCT Filed: Oct. 23, 2013

(86) PCT No.: PCT/US2013/066422
§ 371 (c)(1),
(2) Date: Nov. 4, 2015

(87) PCT Pub. No.: WO2014/182331
PCT Pub. Date: Nov. 13, 2014

(65) Prior Publication Data
US 2016/0168959 A1    Jun. 16, 2016

Related U.S. Application Data

(60) Provisional application No. 61/821,583, filed on May 9, 2013.

(51) Int. Cl.
*G01V 99/00* (2009.01)
*G06T 17/05* (2011.01)
(Continued)

(52) U.S. Cl.
CPC ............ *G01V 99/005* (2013.01); *E21B 49/00* (2013.01); *G06T 17/05* (2013.01); *G06T 19/00* (2013.01); *G01V 2210/665* (2013.01)

(58) Field of Classification Search
CPC ................. G01V 99/00; G01V 99/005; G01V 2210/665; G01V 2210/66; G06T 19/00; G06T 17/05; E21B 49/00
See application file for complete search history.

(56) References Cited

U.S. PATENT DOCUMENTS

| 7,379,854 | B2 * | 5/2008 | Calvert | G01V 1/301 |
| | | | | 703/10 |
| 8,355,898 | B2 * | 1/2013 | Pyrcz | G01V 11/00 |
| | | | | 703/10 |

(Continued)

FOREIGN PATENT DOCUMENTS

| EA | 016477 B1 | 5/2012 |
| RU | 2321064 C2 | 3/2008 |

(Continued)

OTHER PUBLICATIONS

Pyrcz, M., et al. "ALLUVSIM: A Program for Event-Based Stochastic Modeling of Fluvial Depositional Systems" Computers & Geosciences, vol. 35, pp. 1671-1685 (2009).*

(Continued)

*Primary Examiner* — Jay Hann

(57) ABSTRACT

The disclosed embodiments include a method, apparatus, and computer program product for performing gridless simulation of a fluvio-deltaic environment. For example, one disclosed embodiment includes a system that includes at least one processor, and at least one memory coupled to the at least one processor and storing instructions that when executed by the at least one processor performs operations that include generating a set of channel centerlines corresponding to a set of channels that are indicative of flow units in a fluvio-deltaic environment; and generating channel widths for each of the channel centerlines. In one embodiment, the operations for generating the set of channel centerlines of the reservoir include selecting a seed point for each channel, assigning each seed point a direction of propagation, and iteratively generating each channel.

17 Claims, 5 Drawing Sheets

(51) Int. Cl.
*E21B 49/00* (2006.01)
*G06T 19/00* (2011.01)

(56) References Cited

U.S. PATENT DOCUMENTS

| | | | | |
|---|---|---|---|---|
| 8,606,555 | B2 * | 12/2013 | Pyrcz | G01V 9/00 703/10 |
| 2003/0182093 | A1 * | 9/2003 | Jones | E21B 49/00 703/11 |
| 2009/0084545 | A1 | 4/2009 | Banerjee et al. | |
| 2011/0054857 | A1 * | 3/2011 | Moguchaya | G01V 99/00 703/2 |
| 2011/0131015 | A1 * | 6/2011 | Yarus | G01V 99/005 703/1 |

FOREIGN PATENT DOCUMENTS

| | | |
|---|---|---|
| WO | WO-2007084348 A1 | 7/2007 |
| WO | WO-2009151441 A1 | 12/2009 |
| WO | WO-2010068643 A1 | 6/2010 |

OTHER PUBLICATIONS

Jones, Thomas "Using Flowpaths and Vector Fields in Object-Based Modeling" Computers & Geosciences, vol. 27, pp. 133-138 (2001).*
Legleiter, C.J. & Kyriakidis, P.C. "Spatial Prediction of River Channel Topography by Kriging" Earth Surface Processes & Landforms, vol. 33, pp. 841-867 (2008).*
Pyrcz, M. & Deutsch, C. "The Whole Story on the Hole Effect" Geostatistical Association of Australasia. Newsletter 18, West Perth, WA, Australia, 18 pp. (2003) (Year: 2003).*
R.Mohan Srivastava et al., Grid-less Simulation of a Fluvio-Deltaic Environment, May 6, 2013, 8 pages, Geoconvention, 2013.
International Search Report and Written Opinion, dated Feb. 27, 2014, 10 pages; Korean International Searching Authority.
European Patent Office, Supplementary European Search Report, dated Sep. 16, 2016, 6 pages, Europe.
Federal Institute of Industrial Property, Office Action, dated Oct. 11, 2016, 5 pages, Russia.
Marko Maucec, Jeffrey M. Yarus, Genbao Shi and Richard L. Chambers, Grid-less Modeling of Reservoir Properties with Maximum Continuity Field Interpolation, Jun. 11-15, 2012, 15 pages, Ninth International Geostatistics Congress, Oslo, Norway.

* cited by examiner

| 0 | 1 | 1 | 1 | 0 |
|---|---|---|---|---|
| 0 | 0 | 1 | 0 | 0 |
| 0 | 0 | ? | 1 | 0 |
| 0 | 0 | 1 | 1 | 0 |
| 1 | 0 | 1 | 1 | 0 |

FIGURE 1

| 0.02 | 0.03 | 0.05 | 0.01 | 0.00 |
|------|------|------|------|------|
| 0.03 | 0.05 | 0.15 | 0.03 | 0.01 |
| 0.04 | 0.08 | ?    | 0.08 | 0.04 |
| 0.01 | 0.03 | 0.15 | 0.05 | 0.03 |
| 0.00 | 0.01 | 0.05 | 0.03 | 0.02 |

FIGURE 2

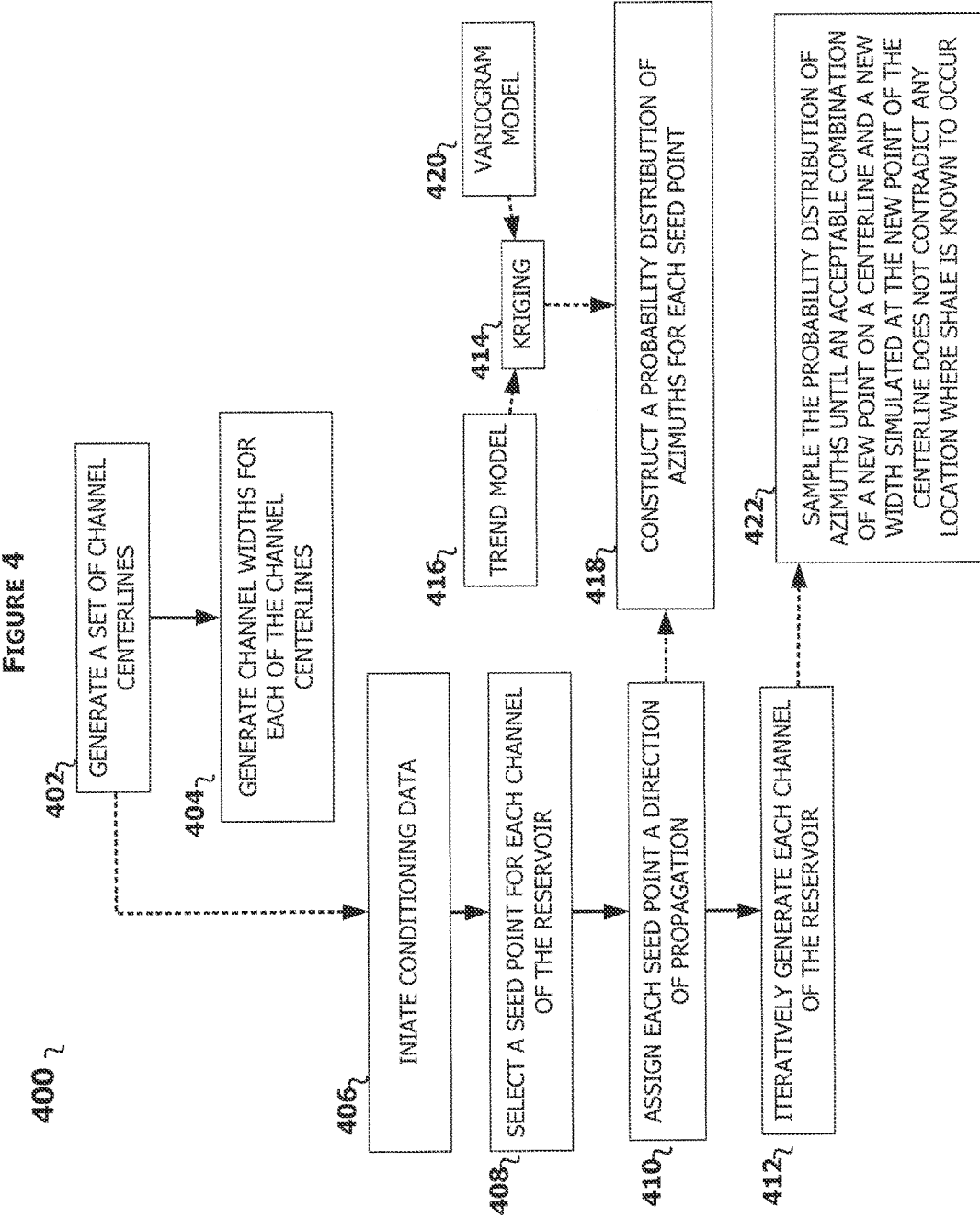

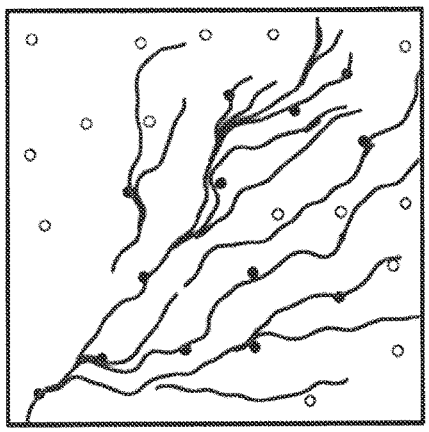
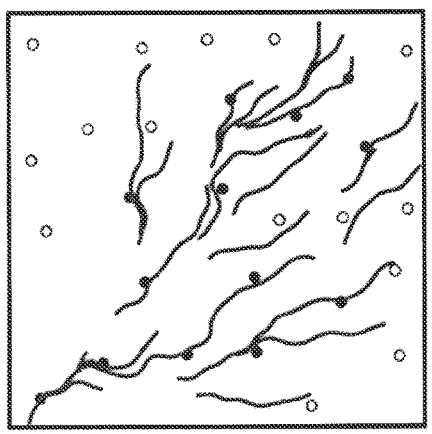
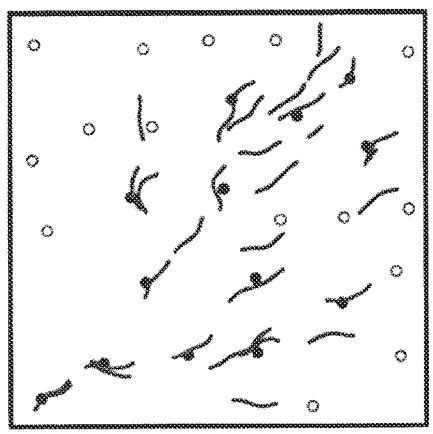
FIGURE 7
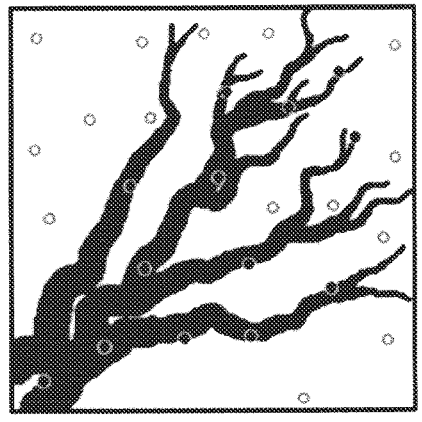
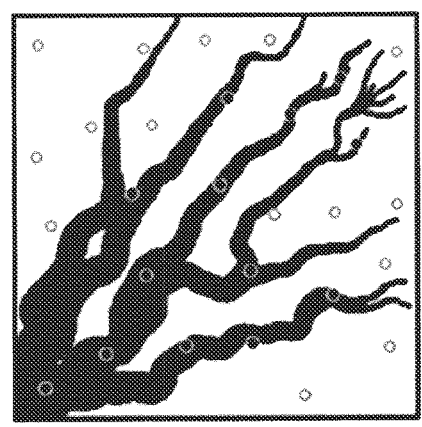
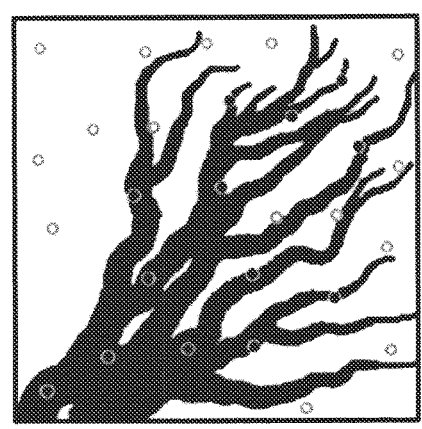
FIGURE 8

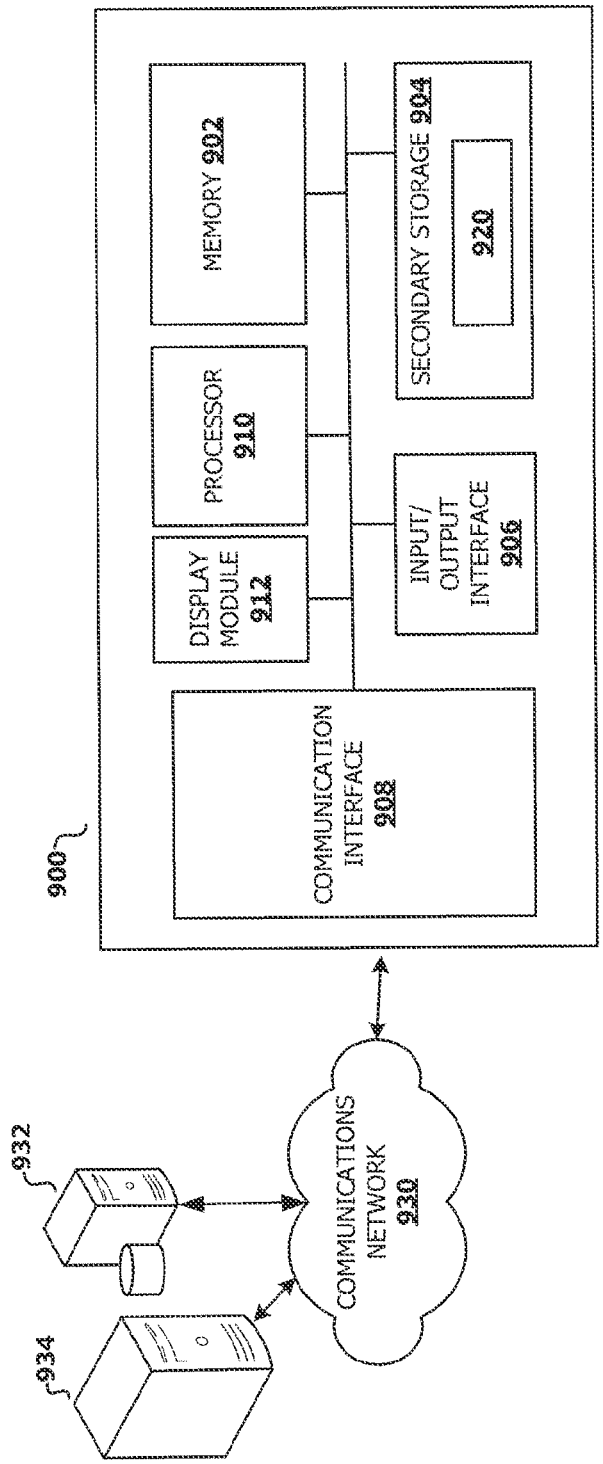

GRIDLESS SIMULATION OF A FLUVIO-DELTAIC ENVIRONMENT

CROSS-REFERENCE TO RELATED APPLICATIONS

This application is a U.S. National Stage patent application of International Patent Application No. PCT/US2013/066422, filed on Oct. 23, 2013, which claims priority to U.S. Provisional Application No. 61/821,583, filed on May 9, 2013, the benefit of both of which are claimed and the disclosure of both of which are incorporated herein by reference in their entirety.

BACKGROUND OF THE INVENTION

In the oil and gas industry, reservoir modeling involves the construction of a computer model of a petroleum reservoir for the purpose of improving estimation of reserves and making decisions regarding the development of the field. For example, geological models may be created to provide a static description of a reservoir prior to production. In many existing geological modeling systems, the subsurface volume is divided into a grid consisting of cells or blocks and geological properties are defined or predicted for the cells or blocks.

BRIEF DESCRIPTION OF THE DRAWINGS

Illustrative embodiments of the present invention are described in detail below with reference to the attached drawing figures, which are incorporated by reference herein and wherein:

FIG. 1 is a diagram illustrating an example of sequential simulation for a simple two-category indicator variable in accordance with the disclosed embodiments;

FIG. 2 is a diagram illustrating kriging weights in accordance with the disclosed embodiments;

FIG. 4 is a flowchart illustrating an example of a computer implemented method for performing gridless simulation of a fluvio-deltaic environment in accordance with the disclosed embodiments;

FIG. 7 is a diagram that illustrates three snapshots of the evolution of a simulation of centerlines in accordance with the disclosed embodiments;

FIG. 8 is a diagram that illustrates three examples of possible final realizations in accordance with the disclosed embodiments; and FIG. 9 is a block diagram illustrating one embodiment of a system for implementing the disclosed embodiments.

DETAILED DESCRIPTION

Figure 3:
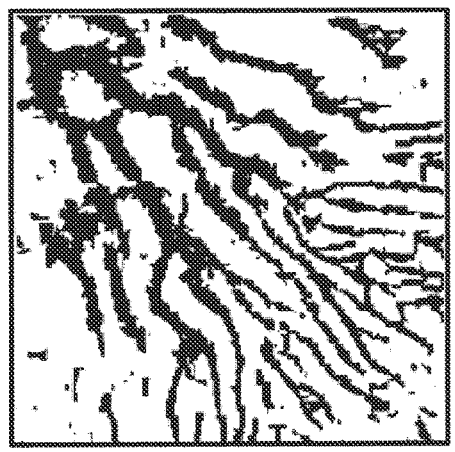
FIG. 3 is a diagram illustrating an example of a simulation of fluvio-deltaic channels using a conventional multi-point statistics algorithm.

Conventional geological modeling systems utilize a grid (i.e., a regular spatial arrangement of points, such as x-y coordinates) and determine properties/values for each grid cell in order to map/model a reservoir. For example, the conventional approach involves moving to a specific location (x) on a grid and determining a plausible value (Z), which could be an integer value such as a facies code, or a continuous variable such as a rock or fluid property for this location. Generally, this is accomplished by building a probability distribution of possible Z values at that location, and randomly sampling from this distribution.

The disclosed embodiments provide an alternative approach to geological modeling. For instance, instead of the conventional approach of determining a value (Z) for a specific location (x) (i.e., Z(x)), the disclosed embodiments starts with known values (Z) and determines plausible locations (x) for which values (Z) may occur (i.e., x(Z)). For example, in one embodiment, a probability distribution is constructed that contains a set of possible locations where a specified value of Z might occur. In one embodiment, this distribution can be randomly sampled, and the value of Z can be propagated to a chosen location. Accordingly, in accordance with the disclosed embodiments, models of a reservoir's rock and fluid properties could be constructed without a pre-determined grid by propagating rock, fluid, or geometric properties to locations that are sequentially chosen.

The disclosed embodiments and additional advantages thereof are best understood by referring to FIGS. 1-9 of the drawings, which are appended at the end of this document, like numerals being used for like and corresponding parts of the various drawings. Other features and advantages of the disclosed embodiments will be or will become apparent to one of ordinary skill in the art upon examination of the following figures and detailed description. It is intended that all such additional features and advantages be included within the scope of the disclosed embodiments. Further, the illustrated figures are only exemplary and are not intended to assert or imply any limitation with regard to the environment, architecture, design, or process in which different embodiments may be implemented.

As used herein, the singular forms "a", "an" and "the" are intended to include the plural forms as well, unless the context clearly indicates otherwise. It will be further understood that the terms "comprise" and/or "comprising," when used in this specification and/or the claims, specify the presence of stated features, integers, steps, operations, elements, and/or components, but do not preclude the presence or addition of one or more other features, integers, steps, operations, elements, components, and/or groups thereof The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. The embodiments were chosen and described to explain the principles of the invention and the practical application, and to enable others of ordinary skill in the art to understand the claimed inventions.

Beginning with FIG. 1, a diagram 100 is presented that depicts an example of sequential simulation for a simple two-category indicator variable that has 0 and 1 as its two possible values. For instance, in one embodiment, this variable may be used to simulate rock type, with the 0 values being used to code one rock type (e.g., sandstone) and the 1 values another rock type (e.g., shale). Although sequential simulation for performing geostatistical simulation is most commonly used for reservoir modeling (e.g., Sequential Gaussian Simulation (SGS) for continuous variables like porosity and Sequential Indicator Simulation (SIS) for categorical variables like facies), other types algorithms may be used in accordance with the disclosed embodiments. In the depicted embodiment, all of the indicators in a local neighborhood (e.g., a 5×5 window) have been simulated and all that remains is to simulate the indicator at a central location. The size of the local neighborhood may vary in accordance with the disclosed embodiments.

For example, in one embodiment, using sequential indicator simulation (SIS), kriging weights are calculated as illustrated in FIG. 2. The weighted average of the indicators provides the probability of encountering a 1 ($P_1$) at the central location. In certain embodiments, a determination as to whether to assign a 0 or a 1 at that location is done by drawing a random number (U) and comparing it to $P_1$. For instance, if U is less than $P_1$, then the central cell is assigned a simulated value of 1. Otherwise, if U is greater than $P_1$, then the simulated value is 0.

The SIS algorithm is conventionally regarded as a procedure in which the process sequentially visits grid nodes and, at each location, builds a probability distribution of the unknown variable at that location. In the case of a simple 0/1 indicator variable as shown in FIG. 1, the distribution is a binary distribution, with a probability $P_0$ of encountering a 0 and a probability $P_1$ of encountering a 1. For example, $P_0$ may simply be the sum of the kriging weights at nearby locations with an indicator of 0, and $P_1$ is the sum of the kriging weights at locations with an indicator of 1. Additionally, the above step in which a uniformly distributed value, U, is compared to $P_1$ is performed by a random sampling of the 0/1 variable with $P_0$ and $P_1$ being the probabilities of each of the two choices. Alternatively, rather than viewing SIS as an algorithm that randomly samples a 0/1 distribution, the algorithm may be configured to take a nearby indicator value and assign it to the central node. For instance, the probability of any particular value being propagated to the central node is exactly its kriging weight as shown in FIG. 2.

However, in accordance with the disclosed embodiments, rather than viewing the task as one of choosing a plausible value at a given location, the disclosed embodiments view the task as one of taking a value known at one location and propagating it to a plausible location nearby. For instance, in accordance with one embodiment, the kriging weights are used to determine where each known value can propagate.

In addition, in certain embodiments, when a known value is propagated to a new location, it is immediately propagated again to another new location. This process creates a "thread" of equal values that "snakes" through an area in a manner controlled by the anisotropy expressed in the variogram model used for kriging.

For comparison purposes, FIG. 3 depicts a diagram that illustrates a simulation of fluvio-deltaic channels using the conventional multi-point statistics algorithm (SNESIM) in a fluvio-deltaic environment that has locally varying directions of maximum continuity and channels that become narrower as one moves further from the paleo-shoreline (sandstone is shown in black and shale is shown in white). The SNESIM algorithm implements the conventional approach Z(x) (i.e., determining a value (Z) for a specific location (x)). As will be described herein, embodiments of the present disclosure will produce a similar simulation result to that of the SNESIM algorithm depicted in FIG. 3 by implementing an algorithm that determines where a certain value/property is located x(Z) rather than determining what value is located here Z(x). However, as will be shown, advantages of the disclosed embodiments over the SNESIM algorithm include 1) being computationally faster to execute, 2) does not require a predetermined grid, and 3) the disclosed embodiments represent the channel architecture or any other any geological facies geometry (e.g., bar, delta, splay, etc.) in a way that facilitates post-processing. For instance, instead of expressing the simulation on a regular grid, as conventional sequential simulations do (e.g., SNESIM), the disclosed embodiments express the simulation with geometric elements: a set of polylines that mark channel centerlines and a set of channel widths.

As an example, FIG. 4 is a diagram that illustrates a process 400 for performing gridless simulation of a fluvio-deltaic environment in accordance with the disclosed embodiments. The process 400 aims to produce a similar result as that shown in FIG. 3, which implements the SNESIM algorithm. In general, the process 400 begins at step 402 by generating a set of channel centerlines corresponding to a set of channels that are indicative of flow units of a reservoir. The process then generates channel widths for each of the channel centerlines at step 404.

Figure 5:
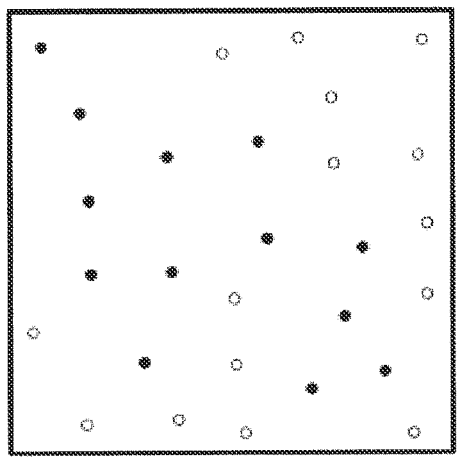
FIG. 5 is a diagram that illustrates conditioning data for performing a simulation in accordance with the disclosed embodiments.

Delving deeper into the process 400, in one embodiment, in generating the set of channel centerlines corresponding to the set of channels, the process, at step 406, is configured to determine or receive conditioning data for performing a simulation. This information may be acquired through seismic exploration, logging, or other techniques by which geological information is obtained. For example, FIG. 5 is a diagram that illustrates an example of conditioning data for performing a simulation in accordance with the disclosed embodiments. In the depicted embodiment, the black dots (e.g., dots 502 and 504) are locations where a well has encountered sandstone, while the white dots (e.g., dots 506 and 508) are locations where shale has been encountered.

Figure 6:
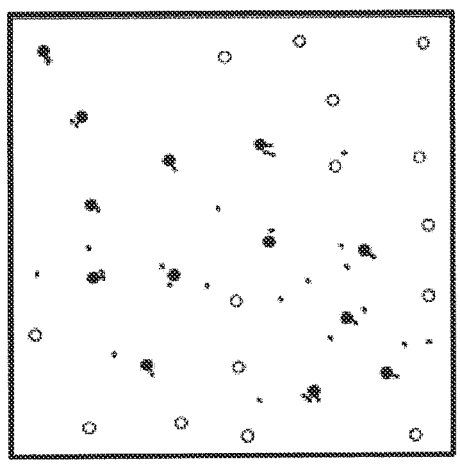
FIG. 6 is a diagram depicting selected seed points corresponding to a set of channels in accordance with the disclosed embodiments.

Once conditioning data is determined, the process 400 then proceeds to select a seed point for each channel of the reservoir at step 408. For example, FIG. 6 is a diagram depicting selected seed points corresponding to a set of channels. In certain embodiments, the process is configured to determine the location of the seed points for the channels so that with a simulated width added to a selected seed point, a channel will cover a location where sandstone is known to occur and not cover any location where shale is known to occur.

At step 410, the process is configured to assign each seed point a direction of propagation and then iteratively generate each channel of the reservoir at step 412. For instance, in one embodiment, the process assigns each point a vector that describes a local direction of maximum continuity, which is the direction in a volume-of-interest along which the magnitude of a geological property stays substantially the same for the greatest distance when moving away from the location of the seed point. As referenced herein, what is considered "substantially the same" may vary under different circumstances. For example, if the geological property is highly variable over a large portion of a volume-of-interest, "substantially the same" may be higher (e.g., 15 percent). However, if the geological property is stable over a large portion of the volume-of-interest, "substantially the same" may be lower (e.g., 5 percent). In certain embodiments, a user may adjust a variable that determines the meaning of "substantially the same." In one embodiment, the process derives the direction of propagation for each seed point from seismic data or from dipmeter data.

In certain embodiments, the seed points may be propagated in either direction. For example, in one embodiment, the process uses a geostatistical method such as kriging 414 with a trend model 416 to calculate or construct a probability distribution for the azimuth at step 418. Kriging, as known in the art, is a method to build an approximation of a function from a set of evaluations of the function at a finite set of points. In one embodiment, in generating the channels, the process at step 422 is configured to sample the probability distribution for the azimuth to determine a plausible direction of propagation. In some embodiments, the process is configured to use nearby azimuths as conditioning data for the estimation of the distribution of azimuths at the tip of each growing centerline.

In addition, in certain embodiments, the kriging method 414 may utilize a variogram model 420 to control the sinuosity of the channels. For instance, in one embodiment, the range of the variogram model controls the distance over which the channels bend. As an example, in one embodiment, a Gaussian variogram model may be used to create a high degree of continuity in the azimuths. As another example, in a meandering river environment, the process may be configured to use a hole effect variogram model, which causes the channels to swing back and forth in a roughly periodic manner.

In one embodiment, as part of the process of sampling the probability distribution for the azimuth to determine a plausible direction of propagation at step 422, the process is configured to ensure that centerlines are not too close a location where shale is known to occur. For instance, in one embodiment, when a centerline is propagated to a new point, the process simulates the channel width at that point (e.g., using kriging with a trend to capture the tendency for channels to become narrower in the distal direction) and performs a check for any nearby wells (e.g., within a radius equal to the simulated width). In one embodiment, if any of the nearby wells is a shale, the simulated azimuth is rejected and the probability distribution of azimuths is resampled. The process repeats the above steps until an acceptable combination of a new point and a new width is found that does not contradict any of the locations where shale is known to occur.

As an example, FIG. 7 is a diagram that illustrates three snapshots of the evolution of a simulation of centerlines in accordance with the disclosed embodiments. As can be seen from FIG. 7, the centerlines are iteratively generated and may propagate in either direction from the original seed point.

FIG. 8 is a diagram that illustrates three examples of possible final realizations in accordance with the disclosed embodiments. The final realizations capture the sand-shale geometry with a set of centerlines and channel widths without the use of an underlying grid. As depicted, the possible final realizations may differ based on how the centerlines are generated and also based on the simulated width.

One advantage of the disclosed embodiments is that the process is configured to generate the simulated values of centerline location and of channel width only where they are needed (i.e., kriging and sampling of probability distributions are done only where they are needed), thus making this style of simulation computationally faster. For example, generating the realizations illustrated in FIG. 8 using the disclosed embodiments involved only a few thousand kriging/sampling calculations. In contrast, were the area to be rasterized with a grid fine enough to resolve the narrowest channels, there would be tens of thousands of pixels, each one requiring a kriging calculation and a sampling of a distribution. Similarly, in a multiple-point statistics approach, replacing kriging with the acquisition of the required statistics further slows the calculation.

In addition, another advantage is that the disclosed embodiments represent the channel architecture in a way that facilitates post-processing. For instance, by rendering the channel architecture as a set of centerlines and channel widths, it is easy to post-process the realizations to extract information on channel morphology. For example, using the disclosed embodiments, it is easy to identify the inside and outside edges of a bending channel. Whereas, extracting the same information from a pixelized image is more difficult. Such information is often useful when overlaying simulated porosity-permeability values onto a simulation of reservoir facies, or when refining a facies simulation to include secondary features, like overbank deposits.

Still, another advantage of the disclosed embodiments is that the final realizations, such as those shown in FIG. 8, are "cleaner" (e.g., channels showing clearer, sharper edges) than the one in FIG. 3, which used the SNESIM algorithm. Although it is easy to dismiss this visual clarity as a merely aesthetic advantage, there are production planning studies in which the existence (or lack) of a continuous pathway through the sandstone is important. For example, certain studies have found that pixelized images that have too much short-scale variability may underestimate the ability of reservoir fluids, and production stimulation fluids, to efficiently move large distances.

Further, the principal parameters required for the simulations shown above are more accessible to most geologists than those required by other geostatistical simulation procedures. For instance, the two key parameters are distributions of channel orientations and widths, which could be extracted from training images, if these exist, or could be provided directly by reservoir geologists since these geometric properties are easier to comprehend than two-point statistics (variograms) and multi-point statistics. The only other parameter, the variogram model that controls channel sinuosity, can also be extracted from training images or, if these are not available, can be calibrated by trial-and-error since the procedure can be rapidly re-run to visually check the impact of different variogram model choices.

FIG. 9 is a block diagram illustrating one embodiment of a system 900 for implementing the features and functions of the disclosed embodiments. Generally, in one embodiment, the system 900 includes, among other components, a processor 900, main memory 902, secondary storage unit 904, an input/output interface module 906, and a communication interface module 908. The processor 900 may be any type or any number of single core or multi-core processors capable of executing instructions for performing the features and functions of the disclosed embodiments.

The input/output interface module 906 enables the system 900 to receive user input (e.g., from a keyboard and mouse) and output information to one or more devices such as, but not limited to, printers, external data storage devices, and audio speakers. The system 900 may optionally include a separate display module 910 to enable information to be displayed on an integrated or external display device. For instance, the display module 910 may include instructions or hardware (e.g., a graphics card or chip) for providing enhanced graphics, touchscreen, and/or multi-touch functionalities associated with one or more display devices.

Main memory 902 is volatile memory that stores currently executing instructions/data or instructions/data that are prefetched for execution. The secondary storage unit 904 is non-volatile memory for storing persistent data. The secondary storage unit 904 may be or include any type of data storage component such as a hard drive, a flash drive, or a memory card. In one embodiment, the secondary storage unit 904 stores the computer executable code/instructions and other relevant data for enabling a user to perform the features and functions of the disclosed embodiments.

For example, in accordance with the disclosed embodiments, the secondary storage unit 904 may permanently store the executable code/instructions 920 for performing the above-described gridless simulation of a fluvio-deltaic environment process. The executable code/instructions 920 are then loaded from the secondary storage unit 904 to main memory 902 during execution by the processor 900 for performing the disclosed embodiments.

Additionally, in some embodiments, the system 900 uses the communication interface module 908 to communicate with a communications network 930. For example, the network interface module 908 may include a network interface card and/or a wireless transceiver for enabling the system 900 to send and receive data through the communications network 930 and/or directly with other devices. The communications network 930 may be any type of network including a combination of one or more of the following networks: a wide area network, a local area network, one or more private networks, the Internet, a telephone network such as the public switched telephone network (PSTN), one or more cellular networks, and wireless data networks. The communications network 930 may include a plurality of network nodes (not depicted) such as routers, network access points/gateways, switches, DNS servers, proxy servers, and other network nodes for assisting in routing of data/communications between devices.

In some embodiments, the system 900 may interact with one or more servers 934 or databases 932 (e.g., Landmark's Engineer's Data Model™ database) for performing the features of the present invention. For instance, the system 900 may query the database 932 to retrieve well data in accordance with the disclosed embodiments.

While specific details about the above embodiments have been described, the above hardware and software descriptions are intended merely as example embodiments and are not intended to limit the structure or implementation of the disclosed embodiments. For instance, although many other internal components of the system 900 are not shown, those of ordinary skill in the art will appreciate that such components and their interconnection are well known.

In addition, certain aspects of the disclosed embodiments, as outlined above, may be embodied in software that is executed using one or more processing units/components.

Program aspects of the technology may be thought of as "products" or "articles of manufacture" typically in the form of executable code and/or associated data that is carried on or embodied in a type of machine readable medium. Tangible non-transitory "storage" type media include any or all of the memory or other storage for the computers, processors or the like, or associated modules thereof, such as various semiconductor memories, tape drives, disk drives, optical or magnetic disks, and the like, which may provide storage at any time for the software programming Additionally, the flowchart and block diagrams in the figures illustrate the architecture, functionality, and operation of possible implementations of systems, methods and computer program products according to various embodiments of the present invention. It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In addition to the embodiments described above, many examples of specific combinations are within the scope of the disclosure, some of which are detailed in the below.

EXAMPLE ONE

A computer-implemented method for performing gridless simulation of a fluvio-deltaic environment, the method comprising generating a set of channel centerlines corresponding to a set of channels that are indicative of flow units of a reservoir; and generating channel widths for each of the channel centerlines.

EXAMPLE TWO

A computer-implemented method for performing gridless simulation of a fluvio-deltaic environment, the method comprising generating a set of channel centerlines corresponding to a set of channels that are indicative of flow units of a reservoir; and generating channel widths for each of the channel centerlines, wherein generating the set of channel centerlines of the reservoir comprises selecting a seed point for each channel of the reservoir, assigning each seed point a direction of propagation, and iteratively generating each channel of the reservoir.

EXAMPLE THREE

A computer-implemented method for performing gridless simulation of a fluvio-deltaic environment, the method comprising generating a set of channel centerlines corresponding to a set of channels that are indicative of flow units of a reservoir; and generating channel widths for each of the channel centerlines, wherein generating the set of channel centerlines of the reservoir comprises selecting a seed point for each channel of the reservoir, assigning each seed point a direction of propagation, and iteratively generating each channel of the reservoir; and wherein assigning each seed point a direction of propagation comprises constructing a probability distribution of azimuths for each seed point.

EXAMPLE FOUR

A computer-implemented method for performing gridless simulation of a fluvio-deltaic environment, the method comprising generating a set of channel centerlines corresponding to a set of channels that are indicative of flow units of a reservoir; and generating channel widths for each of the channel centerlines, wherein generating the set of channel centerlines of the reservoir comprises selecting a seed point for each channel of the reservoir, assigning each seed point a direction of propagation, and iteratively generating each channel of the reservoir; wherein assigning each seed point a direction of propagation comprises constructing a probability distribution of azimuths for each seed point; and wherein iteratively generating each channel of the reservoir comprises sampling the probability distribution of azimuths until an acceptable combination of a new point on a centerline and a new width simulated at the new point of the centerline does not contradict any location where shale is known to occur.

EXAMPLE FIVE

A computer-implemented method for performing gridless simulation of a fluvio-deltaic environment, the method comprising generating a set of channel centerlines corresponding to a set of channels that are indicative of flow units of a reservoir; and generating channel widths for each of the channel centerlines, wherein generating the set of channel centerlines of the reservoir comprises selecting a seed point for each channel of the reservoir, assigning each seed point a direction of propagation, and iteratively generating each channel of the reservoir; wherein assigning each seed point a direction of propagation comprises performing a kriging method to construct a probability distribution of azimuths for each seed point.

EXAMPLE SIX

A computer-implemented method for performing gridless simulation of a fluvio-deltaic environment, the method comprising generating a set of channel centerlines corresponding to a set of channels that are indicative of flow units of a reservoir; and generating channel widths for each of the channel centerlines, wherein generating the set of channel centerlines of the reservoir comprises selecting a seed point for each channel of the reservoir, assigning each seed point a direction of propagation, and iteratively generating each channel of the reservoir; wherein assigning each seed point a direction of propagation comprises performing a kriging method to construct a probability distribution of azimuths for each seed point, and wherein the kriging method utilizes a trend model to capture a tendency for channels to become narrower in a distal direction.

EXAMPLE SEVEN

A computer-implemented method for performing gridless simulation of a fluvio-deltaic environment, the method comprising generating a set of channel centerlines corresponding to a set of channels that are indicative of flow units of a reservoir; and generating channel widths for each of the channel centerlines, wherein generating the set of channel centerlines of the reservoir comprises selecting a seed point for each channel of the reservoir, assigning each seed point a direction of propagation, and iteratively generating each channel of the reservoir; wherein assigning each seed point a direction of propagation comprises performing a kriging method to construct a probability distribution of azimuths for each seed point, and wherein the kriging method utilizes a trend model to capture a tendency for channels to become narrower in a distal direction and a variogram model for controlling a sinuosity of the channels.

EXAMPLE EIGHT

A computer-implemented method for performing gridless simulation of a fluvio-deltaic environment, the method comprising generating a set of channel centerlines corresponding to a set of channels that are indicative of flow units of a reservoir; and generating channel widths for each of the channel centerlines, wherein generating the set of channel centerlines of the reservoir comprises selecting a seed point for each channel of the reservoir, assigning each seed point a direction of propagation, and iteratively generating each channel of the reservoir; wherein assigning each seed point a direction of propagation comprises performing a kriging method to construct a probability distribution of azimuths for each seed point, and wherein the kriging method utilizes a variogram model for controlling a sinuosity of the channels.

EXAMPLE NINE

A computer-implemented method for performing gridless simulation of a fluvio-deltaic environment, the method comprising generating a set of channel centerlines corresponding to a set of channels that are indicative of flow units of a reservoir; and generating channel widths for each of the channel centerlines, wherein generating the set of channel centerlines of the reservoir comprises selecting a seed point for each channel of the reservoir, assigning each seed point a direction of propagation, and iteratively generating each channel of the reservoir; wherein assigning each seed point a direction of propagation comprises constructing a probability distribution of azimuths for each seed point; and wherein iteratively generating each channel of the reservoir comprises sampling the probability distribution of azimuths until an acceptable combination of a new point on a centerline and a new width simulated at the new point of the centerline does not contradict any location where shale is known to occur; and wherein assigning each seed point a direction of propagation comprises performing a kriging method to construct a probability distribution of azimuths for each seed point, and wherein the kriging method utilizes a trend model to capture a tendency for channels to become narrower in a distal direction and a variogram model for controlling a sinuosity of the channels.

EXAMPLE TEN

A system comprising at least one processor; at least one memory coupled to the at least one processor and storing instructions that when executed by the at least one processor performs operations comprising generating a set of channel centerlines corresponding to a set of channels that are indicative of flow units of a reservoir; and generating channel widths for each of the channel centerlines.

EXAMPLE ELEVEN

A system comprising at least one processor; at least one memory coupled to the at least one processor and storing instructions that when executed by the at least one processor performs operations comprising generating a set of channel centerlines corresponding to a set of channels that are indicative of flow units of a reservoir; and generating channel widths for each of the channel centerlines, wherein generating the set of channel centerlines of the reservoir comprises selecting a seed point for each channel of the reservoir, assigning each seed point a direction of propagation, and iteratively generating each channel of the reservoir.

EXAMPLE TWELVE

A system comprising at least one processor; at least one memory coupled to the at least one processor and storing instructions that when executed by the at least one processor performs operations comprising generating a set of channel centerlines corresponding to a set of channels that are indicative of flow units of a reservoir; and generating channel widths for each of the channel centerlines, wherein generating the set of channel centerlines of the reservoir comprises selecting a seed point for each channel of the reservoir, assigning each seed point a direction of propagation, and iteratively generating each channel of the reservoir; and wherein assigning each seed point a direction of propagation comprises constructing a probability distribution of azimuths for each seed point.

EXAMPLE THIRTEEN

A system comprising at least one processor; at least one memory coupled to the at least one processor and storing instructions that when executed by the at least one processor performs operations comprising generating a set of channel centerlines corresponding to a set of channels that are indicative of flow units of a reservoir; and generating channel widths for each of the channel centerlines, wherein generating the set of channel centerlines of the reservoir comprises selecting a seed point for each channel of the reservoir, assigning each seed point a direction of propagation, and iteratively generating each channel of the reservoir; wherein assigning each seed point a direction of propagation comprises constructing a probability distribution of azimuths for each seed point; and wherein iteratively generating each channel of the reservoir comprises sampling the probability distribution of azimuths until an acceptable combination of a new point on a centerline and a new width simulated at the new point of the centerline does not contradict any location where shale is known to occur.

EXAMPLE FOURTEEN

A system comprising at least one processor; at least one memory coupled to the at least one processor and storing instructions that when executed by the at least one processor performs operations comprising generating a set of channel centerlines corresponding to a set of channels that are indicative of flow units of a reservoir; and generating channel widths for each of the channel centerlines, wherein generating the set of channel centerlines of the reservoir comprises selecting a seed point for each channel of the reservoir, assigning each seed point a direction of propagation, and iteratively generating each channel of the reservoir; wherein assigning each seed point a direction of propagation comprises performing a kriging method to construct a probability distribution of azimuths for each seed point.

EXAMPLE FIFTEEN

A system comprising at least one processor; at least one memory coupled to the at least one processor and storing instructions that when executed by the at least one processor performs operations comprising generating a set of channel centerlines corresponding to a set of channels that are indicative of flow units of a reservoir; and generating channel widths for each of the channel centerlines, wherein generating the set of channel centerlines of the reservoir comprises selecting a seed point for each channel of the reservoir, assigning each seed point a direction of propagation, and iteratively generating each channel of the reservoir; wherein assigning each seed point a direction of propagation comprises performing a kriging method to construct a probability distribution of azimuths for each seed point, and wherein the kriging method utilizes a trend model to capture a tendency for channels to become narrower in a distal direction.

EXAMPLE SIXTEEN

A system comprising at least one processor; at least one memory coupled to the at least one processor and storing instructions that when executed by the at least one processor performs operations comprising generating a set of channel centerlines corresponding to a set of channels that are indicative of flow units of a reservoir; and generating channel widths for each of the channel centerlines, wherein generating the set of channel centerlines of the reservoir comprises selecting a seed point for each channel of the reservoir, assigning each seed point a direction of propagation, and iteratively generating each channel of the reservoir; wherein assigning each seed point a direction of propagation comprises performing a kriging method to construct a probability distribution of azimuths for each seed point, and wherein the kriging method utilizes a trend model to capture a tendency for channels to become narrower in a distal direction and a variogram model for controlling a sinuosity of the channels.

EXAMPLE SEVENTEEN

A system comprising at least one processor; at least one memory coupled to the at least one processor and storing instructions that when executed by the at least one processor performs operations comprising generating a set of channel centerlines corresponding to a set of channels that are indicative of flow units of a reservoir; and generating channel widths for each of the channel centerlines, wherein generating the set of channel centerlines of the reservoir comprises selecting a seed point for each channel of the reservoir, assigning each seed point a direction of propagation, and iteratively generating each channel of the reservoir; wherein assigning each seed point a direction of propagation comprises performing a kriging method to construct a probability distribution of azimuths for each seed point, and wherein the kriging method utilizes a variogram model for controlling a sinuosity of the channels.

EXAMPLE EIGHTEEN

A system comprising at least one processor; at least one memory coupled to the at least one processor and storing instructions that when executed by the at least one processor performs operations comprising generating a set of channel centerlines corresponding to a set of channels that are indicative of flow units of a reservoir; and generating channel widths for each of the channel centerlines, wherein generating the set of channel centerlines of the reservoir comprises selecting a seed point for each channel of the reservoir, assigning each seed point a direction of propagation, and iteratively generating each channel of the reservoir; wherein assigning each seed point a direction of propagation comprises constructing a probability distribution of azimuths for each seed point; and wherein iteratively generating each channel of the reservoir comprises sampling the probability distribution of azimuths until an acceptable combination of a new point on a centerline and a new width simulated at the new point of the centerline does not contradict any location where shale is known to occur; and wherein assigning each seed point a direction of propagation comprises performing a kriging method to construct a probability distribution of azimuths for each seed point, and wherein the kriging method utilizes a trend model to capture a tendency for channels to become narrower in a distal direction and a variogram model for controlling a sinuosity of the channels.

EXAMPLE NINETEEN

A non-transitory computer readable medium comprising computer executable instructions for performing gridless simulation of a fluvio-deltaic environment, the computer executable instructions when executed causes one or more machines to perform operations comprising generating a set of channel centerlines corresponding to a set of channels that are indicative of flow units of a reservoir; and generating channel widths for each of the channel centerlines.

EXAMPLE TWENTY

A non-transitory computer readable medium comprising computer executable instructions for performing gridless simulation of a fluvio-deltaic environment, the computer executable instructions when executed causes one or more machines to perform operations comprising generating a set of channel centerlines corresponding to a set of channels that are indicative of flow units of a reservoir; and generating channel widths for each of the channel centerlines, wherein generating the set of channel centerlines of the reservoir comprises selecting a seed point for each channel of the reservoir, assigning each seed point a direction of propagation, and iteratively generating each channel of the reservoir.

EXAMPLE TWENTY-ONE

A non-transitory computer readable medium comprising computer executable instructions for performing gridless simulation of a fluvio-deltaic environment, the computer executable instructions when executed causes one or more machines to perform operations comprising generating a set of channel centerlines corresponding to a set of channels that are indicative of flow units of a reservoir; and generating channel widths for each of the channel centerlines, wherein generating the set of channel centerlines of the reservoir comprises selecting a seed point for each channel of the reservoir, assigning each seed point a direction of propagation, and iteratively generating each channel of the reservoir; and wherein assigning each seed point a direction of propagation comprises constructing a probability distribution of azimuths for each seed point.

EXAMPLE TWENTY-TWO

A non-transitory computer readable medium comprising computer executable instructions for performing gridless simulation of a fluvio-deltaic environment, the computer executable instructions when executed causes one or more machines to perform operations comprising generating a set of channel centerlines corresponding to a set of channels that are indicative of flow units of a reservoir; and generating channel widths for each of the channel centerlines, wherein generating the set of channel centerlines of the reservoir comprises selecting a seed point for each channel of the reservoir, assigning each seed point a direction of propagation, and iteratively generating each channel of the reservoir; wherein assigning each seed point a direction of propagation comprises constructing a probability distribution of azimuths for each seed point; and wherein iteratively generating each channel of the reservoir comprises sampling the probability distribution of azimuths until an acceptable combination of a new point on a centerline and a new width simulated at the new point of the centerline does not contradict any location where shale is known to occur.

EXAMPLE TWENTY-THREE

A non-transitory computer readable medium comprising computer executable instructions for performing gridless simulation of a fluvio-deltaic environment, the computer executable instructions when executed causes one or more machines to perform operations comprising generating a set of channel centerlines corresponding to a set of channels that are indicative of flow units of a reservoir; and generating channel widths for each of the channel centerlines, wherein generating the set of channel centerlines of the reservoir comprises selecting a seed point for each channel of the reservoir, assigning each seed point a direction of propagation, and iteratively generating each channel of the reservoir; wherein assigning each seed point a direction of propagation comprises performing a kriging method to construct a probability distribution of azimuths for each seed point.

EXAMPLE TWENTY-FOUR

A non-transitory computer readable medium comprising computer executable instructions for performing gridless simulation of a fluvio-deltaic environment, the computer executable instructions when executed causes one or more machines to perform operations comprising generating a set of channel centerlines corresponding to a set of channels that are indicative of flow units of a reservoir; and generating channel widths for each of the channel centerlines, wherein generating the set of channel centerlines of the reservoir comprises selecting a seed point for each channel of the reservoir, assigning each seed point a direction of propagation, and iteratively generating each channel of the reservoir; wherein assigning each seed point a direction of propagation comprises performing a kriging method to construct a probability distribution of azimuths for each seed point, and wherein the kriging method utilizes a trend model to capture a tendency for channels to become narrower in a distal direction.

EXAMPLE TWENTY-FIVE

A non-transitory computer readable medium comprising computer executable instructions for performing gridless simulation of a fluvio-deltaic environment, the computer executable instructions when executed causes one or more machines to perform operations comprising generating a set of channel centerlines corresponding to a set of channels that are indicative of flow units of a reservoir; and generating channel widths for each of the channel centerlines, wherein generating the set of channel centerlines of the reservoir comprises selecting a seed point for each channel of the reservoir, assigning each seed point a direction of propagation, and iteratively generating each channel of the reservoir; wherein assigning each seed point a direction of propagation comprises performing a kriging method to construct a probability distribution of azimuths for each seed point, and wherein the kriging method utilizes a trend model to capture a tendency for channels to become narrower in a distal direction and a variogram model for controlling a sinuosity of the channels.

EXAMPLE TWENTY-SIX

A non-transitory computer readable medium comprising computer executable instructions for performing gridless simulation of a fluvio-deltaic environment, the computer executable instructions when executed causes one or more machines to perform operations comprising generating a set of channel centerlines corresponding to a set of channels that are indicative of flow units of a reservoir; and generating channel widths for each of the channel centerlines, wherein generating the set of channel centerlines of the reservoir comprises selecting a seed point for each channel of the reservoir, assigning each seed point a direction of propagation, and iteratively generating each channel of the reservoir; wherein assigning each seed point a direction of propagation comprises performing a kriging method to construct a probability distribution of azimuths for each seed point, and wherein the kriging method utilizes a variogram model for controlling a sinuosity of the channels.

EXAMPLE TWENTY-SEVEN

A non-transitory computer readable medium comprising computer executable instructions for performing gridless simulation of a fluvio-deltaic environment, the computer executable instructions when executed causes one or more machines to perform operations comprising generating a set of channel centerlines corresponding to a set of channels that are indicative of flow units of a reservoir; and generating channel widths for each of the channel centerlines, wherein generating the set of channel centerlines of the reservoir comprises selecting a seed point for each channel of the reservoir, assigning each seed point a direction of propagation, and iteratively generating each channel of the reservoir; wherein assigning each seed point a direction of propagation comprises constructing a probability distribution of azimuths for each seed point; and wherein iteratively generating each channel of the reservoir comprises sampling the probability distribution of azimuths until an acceptable combination of a new point on a centerline and a new width simulated at the new point of the centerline does not contradict any location where shale is known to occur; and wherein assigning each seed point a direction of propagation comprises performing a kriging method to construct a probability distribution of azimuths for each seed point, and wherein the kriging method utilizes a trend model to capture a tendency for channels to become narrower in a distal direction and a variogram model for controlling a sinuosity of the channels.

While many specific example embodiments are described above, the above examples are not intended to be exhaustive or limit the invention in the form disclosed. Many modifications and variations will be apparent to those of ordinary skill in the art without departing from the scope and spirit of the invention. The scope of the claims is intended to broadly cover the disclosed embodiments and any such modification.

The invention claimed is:

1. A computer-implemented method for performing gridless simulation of a fluvio-deltaic environment, the method comprising:
   determining, by a computer system, conditioning data for a gridless simulation of flow units in a reservoir, the conditioning data indicating a value of a geological property measured at each of a plurality of well locations throughout the reservoir;
   selecting seed points corresponding to a set of channels that are indicative of the reservoir's flow units, based on the conditioning data;
   generating a probability distribution of azimuths for propagating a centerline of each channel in the set of channels from a corresponding seed point to a new point in the reservoir;
   determining a direction of propagation for the centerline of each channel to be propagated from the corresponding seed point to the new point such that a simulated width of the channel covers only locations in the reservoir at which the probability distribution indicates the geological property is likely to occur, based on the probability distribution of azimuths generated for that seed point;
   propagating the centerline along with the value of the geological property for each channel in the set of channels from the corresponding seed point to the new point, based on the direction of propagation determined from the probability distribution of azimuths generated for that seed point;
   estimating a distribution of azimuths at a tip of the centerline propagated for each channel;
   propagating the centerline for each channel from the new point to additional points in the reservoir, based on the estimated distribution of azimuths;
   generating channel widths for the centerline propagated for each channel in the set of channels;
   estimating petroleum reserves to be produced from the reservoir based on the gridless simulation of the reservoir's flow units according to the generated channel widths of the centerline propagated for each channel; and
   performing production operations at one or more well locations within the reservoir, based on the estimated petroleum reserves.

2. The computer-implemented method of claim 1, wherein the direction of propagation for the centerline of each channel to be propagated from the corresponding seed point is determined using kriging weights based on known values at nearby locations and the probability distribution of azimuths generated for that seed point.

3. The computer-implemented method of claim 1, further comprising performing kriging to construct the probability distribution of azimuths for each seed point.

4. The computer-implemented method of claim 3, wherein the kriging utilizes a trend model to capture a tendency for channels to become narrower in a distal direction.

5. The computer-implemented method of claim 4, wherein the kriging utilizes a variogram model for controlling a sinuosity of the channels.

6. The computer-implemented method of claim 5, wherein the variogram model is a hole effect variogram model.

7. A system comprising:
   at least one processor;
   at least one memory coupled to the at least one processor and storing instructions that when executed by the at least one processor performs operations comprising:
   determining conditioning data for a gridless simulation of flow units in a reservoir, the conditioning data indicating a value of a geological property measured at each of a plurality of well locations throughout the reservoir;
   selecting seed points corresponding to a set of channels that are indicative of the reservoir's flow units in a fluvio-deltaic environment, based on the conditioning data;
   generating a probability distribution of azimuths for propagating a centerline of each channel in the set of channels from a corresponding seed point to a new point in the reservoir;
   determining a direction of propagation for the centerline of each channel to be propagated from the corresponding seed point to the new point such that a simulated width of the channel covers only locations in the reservoir at which the probability distribution indicates the geological property is likely to occur, based on the probability distribution of azimuths generated for that seed point;

propagating the centerline along with the value of the geological property for each channel in the set of channels from the corresponding seed point to the new point, based on the direction of propagation determined from the probability distribution of azimuths generated for that seed point;

estimating a distribution of azimuths at a tip of the centerline propagated for each channel;

propagating the centerline for each channel from the new point to additional points in the reservoir, based on the estimated distribution of azimuths;

generating channel widths for the centerline propagated for each channel in the set of channels; and estimating petroleum reserves to be produced from the reservoir based on the gridless simulation of the reservoir's flow units according to the generated channel widths of the centerline propagated for each channel, wherein the estimated petroleum reserves are used to perform production operations at one or more well locations within the reservoir.

8. The system of claim 7, wherein the direction of propagation for the centerline of each channel to be propagated from the corresponding seed point is determined using kriging weights based on known values at nearby locations and the probability distribution of azimuths generated for that seed point.

9. The system of claim 7, wherein the operations further comprise performing kriging to construct the probability distribution of azimuths for each seed point.

10. The system of claim 9, wherein the operations for performing the kriging utilizes a trend model to capture a tendency for channels to become narrower in a distal direction.

11. The system of claim 10, wherein the operations for performing the kriging utilizes a variogram model for controlling a sinuosity of the channels.

12. The system of claim 11, wherein the variogram model is a hole effect variogram model.

13. A non-transitory computer readable medium comprising computer executable instructions for performing gridless simulation of a fluvio-deltaic environment, the computer executable instructions when executed causes a computer to perform operations comprising:

determining conditioning data for a gridless simulation of flow units in a reservoir, the conditioning data indicating a value of a geological property measured at each of a plurality of well locations throughout the reservoir;

selecting seed points corresponding to a set of channels that are indicative of the reservoir's flow units, based on the conditioning data;

generating a probability distribution of azimuths for propagating a centerline of each channel in the set of channels from a corresponding seed point to a new point in the reservoir;

determining a direction of propagation for the centerline of each channel to be propagated from the corresponding seed point to the new point such that a simulated width of the channel covers only locations in the reservoir at which the probability distribution indicates the geological property is likely to occur, based on the probability distribution of azimuths generated for that seed point;

propagating the centerline along with the value of the geological property for each channel in the set of channels from the corresponding seed point to the new point, based on the direction of propagation determined from the probability distribution of azimuths generated for that seed point;

estimating a distribution of azimuths at a tip of the centerline propagated for each channel;

propagating the centerline for each channel from the new point to additional points in the reservoir, based on the estimated distribution of azimuths;

generating channel widths for the centerline propagated for each channel in the set of channels; and estimating petroleum reserves to be produced from the reservoir based on the gridless simulation of the reservoir's flow units according to the generated channel widths of the centerline propagated for each channel, wherein the estimated petroleum reserves are used to perform production operations at one or more well locations within the reservoir.

14. The non-transitory computer readable medium of claim 13, wherein the direction of propagation for the centerline of each channel to be propagated from the corresponding seed point is determined using kriging weights based on known values at nearby locations and the probability distribution of azimuths generated for that seed point.

15. The non-transitory computer readable medium of claim 13, wherein the operations further comprise performing kriging to construct the probability distribution of azimuths for each seed point, and wherein the kriging utilizes a trend model to capture a tendency for channels to become narrower in a distal direction.

16. The non-transitory computer readable medium of claim 13, wherein the operations further comprise performing kriging to construct the probability distribution of azimuths for each seed point, and wherein the kriging utilizes a variogram model for controlling a sinuosity of the channels.

17. The non-transitory computer readable medium of claim 16, wherein the variogram model is a hole effect variogram model.

* * * * *